(12) United States Patent
Axe et al.

(10) Patent No.: US 8,494,900 B2
(45) Date of Patent: Jul. 23, 2013

(54) ADJUSTING AD COSTS USING DOCUMENT PERFORMANCE OR DOCUMENT COLLECTION PERFORMANCE

(75) Inventors: Brian Axe, San Francisco, CA (US);
Doug Beeferman, Palo Alto, CA (US);
Amit Patel, Cupertino, CA (US);
Nathan Stoll, San Francisco, CA (US);
Hal Varian, Lafayette, CA (US)

(73) Assignee: Google Inc., Mountain View, CA (US)

( * ) Notice: Subject to any disclaimer, the term of this patent is extended or adjusted under 35 U.S.C. 154(b) by 3000 days.

(21) Appl. No.: 10/880,972

(22) Filed: Jun. 30, 2004

(65) Prior Publication Data

US 2006/0004628 A1 Jan. 5, 2006

(51) Int. Cl.
*G06Q 30/00* (2006.01)

(52) U.S. Cl.
USPC .......................................................... 705/14

(58) Field of Classification Search
USPC .......................................................... 705/14
See application file for complete search history.

(56) References Cited

U.S. PATENT DOCUMENTS

| | | | |
|---|---|---|---|
| 6,134,532 A | 10/2000 | Lazarus et al. | |
| 6,269,361 B1 * | 7/2001 | Davis et al. | 707/3 |
| 6,560,578 B2 | 5/2003 | Eldering | |
| 6,654,725 B1 | 11/2003 | Langheinrich et al. | |
| 6,816,857 B1 | 11/2004 | Weissman et al. | |
| 7,065,500 B2 * | 6/2006 | Singh et al. | 705/26 |
| 7,406,460 B2 * | 7/2008 | Burrows | 707/3 |
| 2003/0046161 A1 * | 3/2003 | Kamangar et al. | 705/14 |
| 2003/0055729 A1 | 3/2003 | Bezos et al. | |
| 2004/0006509 A1 * | 1/2004 | Mannik et al. | 705/14 |

OTHER PUBLICATIONS

Donna L. Hoffman and Thomas P. Novak, *When Exposure-Based Web Advertising Stops Making Sense (And What CDNOW Did About It)*, pp. 1-16 (2000).
PCT/IB/326, "Notification Concerning Transmittal of International Preliminary Report on Patentability" for PCT/US2005/023163, mailed Jan. 18, 2007 (1 pg.).
PCT/IB/373, "International Preliminary Report on Patentability" for PCT/US2005/023163, mailed Jan. 18, 2007 (1 pg.).
PCT/ISA/237, "Written Opinion of the International Searching Authority" for PCT/US05/023163, mailed Jan. 25, 2006 (4 pgs.).

(Continued)

*Primary Examiner* — Alvin L Brown
(74) *Attorney, Agent, or Firm* — Straub & Pokotylo; John C. Pokotylo

(57) ABSTRACT

Documents or document sets may be scored to reflect a value of an action, such as a selection for example, when an ad is served with the document (or a document belonging to a document set). A cost associated with the action with respect to an ad that was served with a document may then be adjusted using the score. For example, ad scores may be accepted or determined, and a document may be scored using the ad scores when served with the document and ad scores across a collection of documents to generate a document score. Each of the ad scores may indicate a value of an action with respect to an ad, such as a conversion rate, or a return on investment for an ad selection for example. Document scores used in this way may help advertisers get a more consistent cost per conversion, or return on investment, without requiring them to enter and manage various offers for various documents and/or various ad serving systems having various conversion rates or returns on investment.

50 Claims, 7 Drawing Sheets

OTHER PUBLICATIONS

Examiner's First Report to Australian Patent Application No. 2005260567, mailed Mar. 6, 2008 (2 pgs.).
First Examination Report for Indian Patent Application No. 132/MUMNP/2007, dated Oct. 29, 2008 (2 pgs.).
Canadian Office Action for Canadian Patent Application No. 2,572,582, mailed Sep. 8, 2009 (5 pgs.).
Office Action for Canadian Patent Application No. 2,572,582, mailed Nov. 24, 2011 (4 pgs.).

* cited by examiner

ADJUSTING AD COSTS USING DOCUMENT PERFORMANCE OR DOCUMENT COLLECTION PERFORMANCE

§1. BACKGROUND OF THE INVENTION

§1.1 Field of the Invention

The present invention concerns advertisements ("ads"), such as ads served in an online environment. In particular, the present invention concerns techniques that can be used to help simplify the management of ad campaigns where the ad may be served with various documents using various techniques, and where the various documents may have different values per selection (or some other action triggering a charge to the advertiser) and the various techniques may have different values per selection.

§1.2 Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Interactive advertising provides opportunities for advertisers to target their ads to a receptive audience. That is, targeted ads are more likely to be useful to end users since the ads may be relevant to a need inferred from some user activity (e.g., relevant to a user's search query to a search engine, relevant to content in a document requested by the user, etc.) Query keyword-relevant advertising, such as the AdWords advertising system by Google of Mountain View, Calif., has been used by search engines. Similarly, content-relevant advertising systems have been proposed. For example, U.S. patent application Ser. No. 10/314,427 (incorporated herein by reference and referred to as "the '427 application") titled "METHODS AND APPARATUS FOR SERVING RELEVANT ADVERTISEMENTS", filed on Dec. 6, 2002 and listing Jeffrey A. Dean, Georges R. Harik and Paul Buchheit as inventors; and Ser. No. 10/375,900 (incorporated by reference and referred to as "the '900 application") titled "SERVING ADVERTISEMENTS BASED ON CONTENT," filed on Feb. 26, 2003 and listing Darrell Anderson, Paul Buchheit, Alex Carobus, Claire Cui, Jeffrey A. Dean, Georges R. Harik, Deepak Jindal and Narayanan Shivakumar as inventors, describe methods and apparatus for serving ads relevant to the content of a document, such as a Web page for example. Content-relevant advertising, such as the AdSense advertising system by Google, have been used to serve ads on Web pages.

In any advertising system, it is assumed that advertisers mainly want sales (which is a specific type of conversion). Although there are also advertisers who want exposure (branding), the present inventors believe that sales is the main motivation for most advertisers. In an advertising system in which an advertiser pays only when its ad is selected, assuming that an advertiser is rational, its maximum offer per selection will be its expected profit from the selection. The problem is that different ad systems provide different conversion rates (e.g., sales per selection). Moreover, ad serving systems which use targeting techniques that let more ads compete for serving on a given document (e.g., due to broad matching permitted for targeting) may impose higher prices (e.g., cost per selection) on advertisers, while at the same time possibly having a lower value per selection. Thus, although such systems may provide useful ways to advertise, advertisers may nonetheless avoid them in favor of ad serving systems having providing a higher value per selection, and/or a lower cost per selection.

Even within a content-relevant ad system, conversion rates often vary across different publishers and different Web pages. This complicates ad campaign management.

One way to address this problem is to provide a pay-per-conversion scheme. Unfortunately, pay-per-conversion is not popular at this time for a number of reasons. For example, many small advertisers don't have the technical sophistication needed to establish and manage a pay-per-conversion ad campaign. Further, many large advertisers don't trust outside parties, such as advertising systems, with their sales data.

Another way to address this problem—at least in the context of a content-relevant ad serving system—is to allow advertisers to make different offers for different publishers or Web pages. Unfortunately, separate bidding per publisher is impractical for most advertisers.

Finally, one way to address the problem of different conversion rates for different ad systems (such as a query keyword-relevant ad system and a content-relevant ad system) is to permit advertisers to make different offers for the different ad systems. For example, Overture of Pasadena, Calif., permits separate bidding for content ads and search ads. Unfortunately, however, this doubles the number of ad campaigns that an advertiser will need to manage. Moreover, this solution does not address the fact that there may be quite a bit of variation in conversion rates among the various content publishers and among the various search publishers.

The fact that different publishers or Web pages have different conversion rates also raises an additional problem. Specifically, publishers with good conversion rates may end up subsidizing publishers with poor conversion rates in systems in which advertisers enter one offer across all publishers. Publisher subsidies are undesirable because they punish publishers with good conversion rates and reward publishers with bad conversion rates. Over time, a content-relevant ad network that subsidizes bad publishers at the expense of good publishers will attract more publishers with bad conversion rates. This may cause advertisers to lower overall maximum offers per selection over time.

In view of the foregoing, it would be useful to help advertisers to manage an ad campaign across different systems having different conversion rates, or event within a given ad system, such as a content-relevant ad system in which different publishers or Web pages have different conversion rates. More generally, it would be useful to simplify ad campaign management, while automatically adjusting (e.g., reducing) costs for an action (e.g., an impression, a selection, etc.) using factors that may affect a value of the action.

It would also be useful to reduce or eliminate publisher subsidies in a content-relevant ad system.

§2. SUMMARY OF THE INVENTION

At least some embodiments consistent with the present invention may be used to help advertisers get a more consistent cost per conversion, or return on investment, without requiring them to enter and manage various offers for various properties and/or ad systems having various conversion rates. At least some embodiments may score documents or document sets. A cost associated with selecting an ad served with a document may then be adjusted using the score. For example, at least some embodiments consistent with the present invention may (a) accept or determine ad scores, and (b) score a document (of document set) using ad scores when served with the document (or documents of the document set) and ad scores across a collection of documents (or a collection of document sets) to generate a document (or document set) score. In at least some embodiments consistent with the present invention, each of the ad scores indicates a value of selecting an ad, such as a conversion rate (e.g., conversions per monetary amount, conversions per selection, conversions per impression, etc.), or a return on investment for an ad selection.

In at least some embodiments consistent with the present invention, the document (or document set) score may be adjusted using a determined variation (or some other measure of confidence) in ad scores for the document (or document set) to generate a new document score.

In at least some embodiments consistent with the present invention, a cost for a selection of an ad (or some other action with respect to an ad) that was served with a document is accepted and is adjusted using the document (or document set) score to generate a modified cost. Alternatively, ad serve information used to determine a cost of a selection (or some other action) of the ad served with the document may be accepted and a cost may be determined using the accepted ad serve information and the document (or document set) score.

In at least some embodiments consistent with the present invention, the document is a Web page. In at least some embodiments consistent with the present invention, the document set is a Website, consists of Web pages of a particular Web publisher, consists of Web page views of a given search Website, or consists of Web pages of a particular content server.

§3. BRIEF DESCRIPTION OF THE DRAWINGS

§4. DETAILED DESCRIPTION

The present invention may involve novel methods, apparatus, message formats, and/or data structures for scoring documents or document groups using some measure of the value (e.g., the expected conversion rate information) of an action with respect to an ad that was served with the document or a document of the document group, and/or using such a score of a document or document group to adjust or determine a cost to be paid by an advertiser when its ad is served with the document or with a document of the document group. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

In the following, environments in which, or with which, the present invention may operate are described in §4.1. Then, exemplary embodiments consistent with the present invention are described in §4.2. Examples of operations are provided in §4.3. Finally, some conclusions regarding the present invention are set forth in §4.4.

§4.1 Environments in which, or with which, The Present Invention may Operate

§4.1.1 Exemplary Advertising Environment

Figure 1:
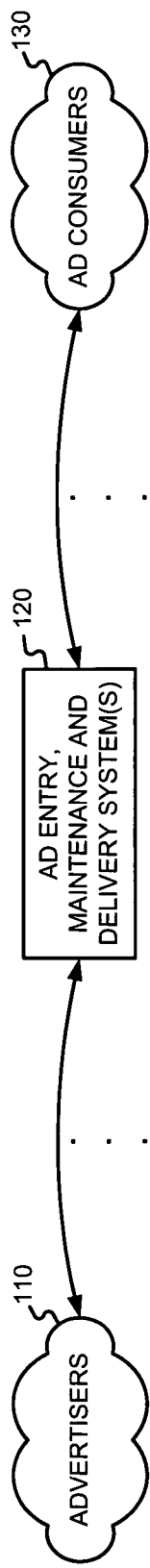
FIG. 1 is a high-level diagram showing parties or entities that can interact with an advertising system.

FIG. 1 is a high level diagram of an advertising environment. The environment may include an ad entry, maintenance and delivery system (simply referred to as an "ad server" or "ad system") 120. Advertisers 110 may directly, or indirectly, enter, maintain, and track ad information in the system 120. The ads may be in the form of graphical ads such as so-called banner ads, text only ads, image ads, audio ads, animation ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or a selection related to the ad occurred) to the system 120. This usage information may include measured or observed user behavior related to ads that have been served.

Figure 2:
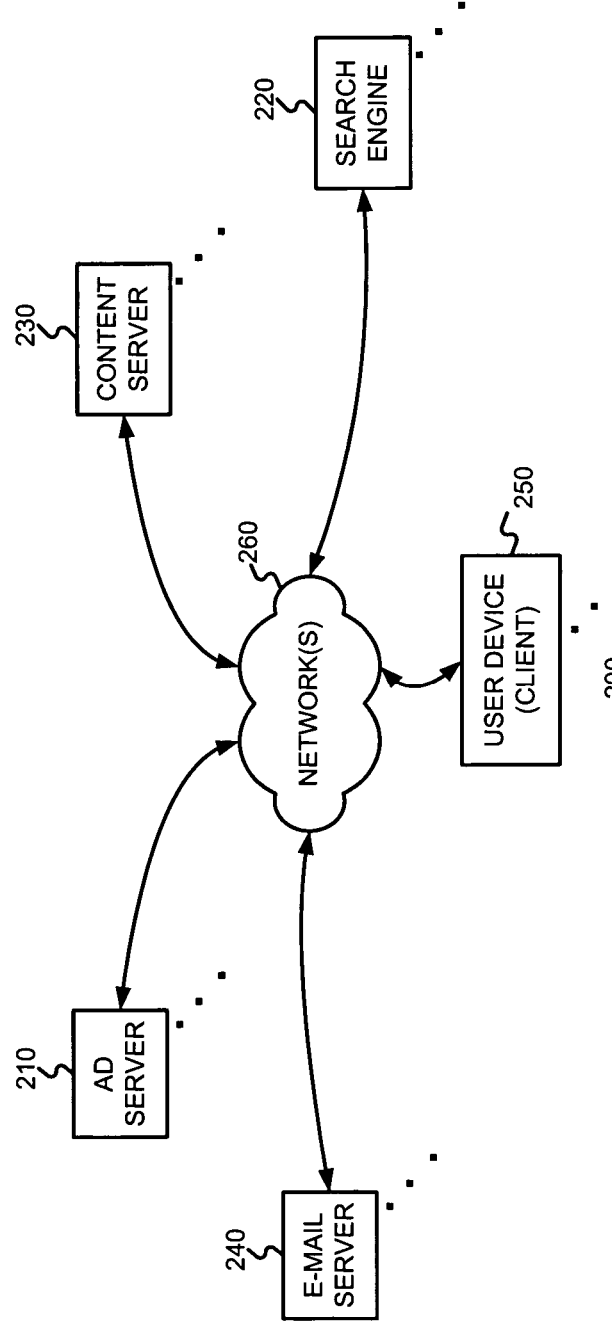
FIG. 2 is a diagram illustrating an environment in which, or with which, embodiments consistent with the present invention may operate.

The ad server 120 may be similar to the one described in FIG. 2 of the '900 application. An advertising program may include information concerning accounts, campaigns, creatives, targeting, etc. The term "account" relates to information for a given advertiser (e.g., a unique e-mail address, a password, billing information, etc.). A "campaign" or "ad campaign" may be used to refer to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information (e.g., a set of keywords, a set of one or more topics, geolocation information, user profile information, etc.), and price information (e.g., a maximum cost or offer per selection, a maximum cost or offer per conversion, a cost or offer per selection, a cost or offer per conversion, etc.). Alternatively, or in addition, each ad group may include an average cost (e.g., average cost per selection, average cost per conversion, etc.). Therefore, a single maximum cost, cost, and/or a single average cost may be associated with one or more keywords, and/or topics. As stated, each ad group may have one or more ads or "creatives" (That is, ad content that is ultimately rendered to an end user.). Each ad may also include a link to a URL (e.g., a landing Web page, such as the home page of an advertiser, or a Web page associated with a particular product or service). Naturally, the ad information may include more or less information, and may be organized in a number of different ways.

FIG. 2 illustrates an environment 200 in which the present invention may be used. A user device (also referred to as a "client" or "client device") 250 may include a browser facility (such as the Explorer browser from Microsoft, the Opera Web Browser from Opera Software of Norway, the Navigator browser from AOL/Time Warner, etc.), some other content rendering facility, an e-mail facility (e.g., Outlook from Microsoft), etc. A search engine 220 may permit user devices 250 to search collections of documents (e.g., Web pages). A content server 210 may permit user devices 250 to access documents. An e-mail server (such as Hotmail from Microsoft Network, Yahoo Mail, etc.) 240 may be used to provide e-mail functionality to user devices 250. An ad server 210 may be used to serve ads to user devices 250. For example, the ads may be served in association with search results provided by the search engine 220. Alternatively, or in addition, content-relevant ads may be served in association with content provided by the content server 230, and/or e-mail supported by the e-mail server 240 and/or user device e-mail facilities.

As discussed in the '900 application (introduced above), ads may be targeted to documents served by content servers. Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., a Web page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where the ads are to be rendered (e.g., position, selection or not, impression time, impression date, size, conversion or not, etc.) back to the ad server 120/210. Alternatively, or in addition, such information may be provided back to the ad server 120/210 by some other means.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate, and/or as described below, information related to, and/or derived from, the search query), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

The search engine 220 may transmit information about the ad and when, where, and/or how the ad was to be rendered (e.g., position, click-through or not, impression time, impression date, size, conversion or not, etc.) back to the ad server 120/210. As described below, such information may include information for determining on what basis the ad was determined relevant (e.g., strict or relaxed match, or exact, phrase, or broad match, etc.) Alternatively, or in addition, such information may be provided back to the ad server 120/210 by some other means.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under over, or otherwise in association with an e-mail.

Although the foregoing examples described servers as (i) requesting ads, and (ii) combining them with content, one or both of these operations may be performed by a client device (such as an end user computer for example).

§4.1.2 Definitions

Online ads may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, etc.), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, a type of targeting used (e.g., concept (which may include the specific type of concept targeting used), broad keyword, exact keyword, phrase keyword, etc.), degree of relevancy of ad, a quality metric of a publisher with which the ad was served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Conversions can also be tracked with different levels of granularity (e.g., number of items purchased, classes of items or services purchased, total purchase cost, limited to one conversion per selection in a conservative case, etc.) Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions or selections of the ad (i.e., the number of times an ad is rendered or selected) is referred to as the "conversion rate." If a conversion is defined to be able to occur within a predetermined time since the serving of an ad, one possible definition of the conversion rate might only consider ads that have been served more than the predetermined time in the past.

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio or video file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

"Ad area" may be used to describe an area (e.g., spatial and/or temporal) of a document reserved or made available to accommodate the rendering of ads. For example, Web pages often allocate a number of spots where ads can be rendered, referred to as "ad spots". As another example, an audio program may allocate "ad time slots".

§4.2 Exemplary Embodiments

Embodiments consistent with the present invention may be used to help advertisers get a more consistent cost per conversion, or return on investment, without requiring them to enter and manage various offers for various ad systems, and/or documents (or document sets) having various conversion rates. First, embodiments consistent with the present invention may be used to score documents, or sets of documents, using some measure of value, such as conversion rate performance or return on investment performance for example. Second, embodiments consistent with the present invention may be used to adjust a cost for an action with respect to an ad (e.g., an ad selection) using a determined document (or document set) score.

A goal of an embodiment consistent with the present invention may be to have a maximum offer per selection more closely match an ideal maximum offer per selection; namely E(profit/selection), where "E" denotes "estimated". E(profit/selection) may be expressed as E(profit/sale * sale/selection). Assuming that E(profit/sale) is independent of the document with which the ad is served, an ideal maximum offer per selection could be E(profit/sale * sale/selection)=E(profit/sale) * E(sale/selection). Although there may be some data about E(sale/selection) tracked (Recall, e.g., 332 of FIG. 3.), such data might not be available for all advertisers. The present invention may be used to help advertisers using this data.

One useful parameter for measuring the "value" of some action with respect to an ad may be "sales per dollar", sometimes referred to in this context as return on investment (ROI). Although ROI may also consider the value of those sales, each sale can be assumed to have equal value for simplicity (and since the advertiser might not want to share such information). In one exemplary embodiment, in cases in which the value of each individual sale is unknown, each sale may be treated as having equal value. From a standpoint of simplifying ad campaign management, an advertiser may want a dollar invested in marketing to produce roughly the same returns regardless of where that dollar was spent. (More generally, however, the advertiser should want the ROI to be positive such that expected revenue exceeds cost. For example, even if advertising on "Paris hotels" is very profitable for an advertiser, it still might want to advertise on "French hotels", even though it isn't as profitable. Once the advertiser advertises all it can on the most profitable words, it can then move on to less profitable (but still profitable) words. Thus, more generally, an advertiser should want a dollar invested in marketing to achieve positive returns regardless of where that dollar is spent.)

Figure 3:
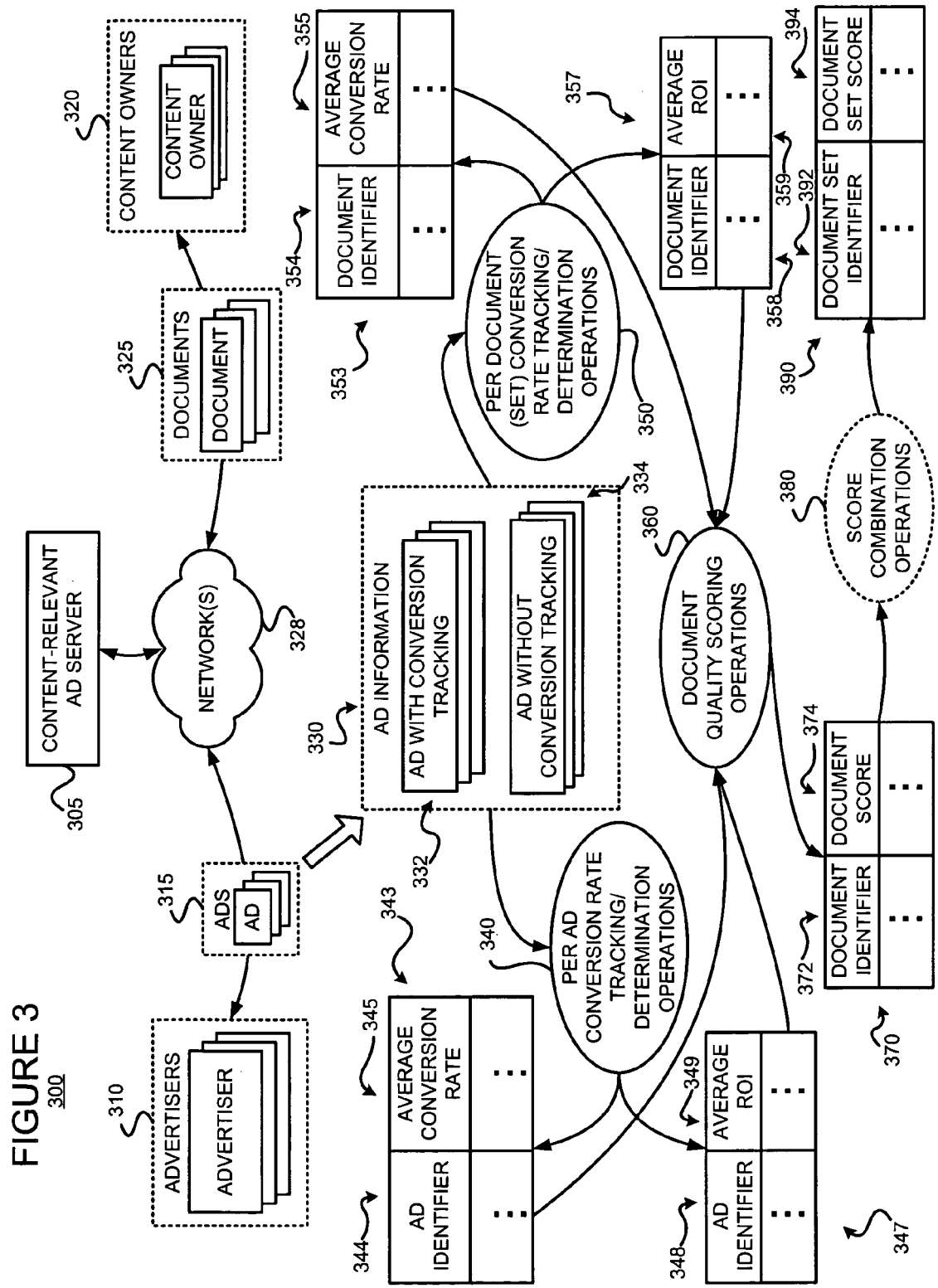
FIG. 3 is a bubble diagram of operations and information for scoring documents in a manner consistent with the present invention may operate.

FIG. 3 is a bubble diagram of operations and information for scoring documents (or document sets) in a manner consistent with the present invention. As shown, a content-relevant ad server 305 may interact with advertisers 310 and content owners (e.g., content servers) 320 via one or more networks 328, such as the Internet for example. More specifically, the content-relevant ad server 305 may be used to serve ads 315 from the advertisers 310 with documents (e.g., Web pages) 325 from content owners 320. Although not shown in FIG. 3, other ad servers may serve ads with other documents, such as search result pages for example.

As shown by 330, at least some 332 of the ads 330 might support conversion tracking, while at least some other 334 of the ads 330 might not support conversion tracking. Various useful information can be derived from the ads with conversion tracking 332. For example, per ad conversion rate tracking/determination operations 340 may be used to generate information 343 which may indicate a conversion rate 345 (e.g., across a collection of documents, or across all documents) for each of one or more ads 344. If further information is available, information 347 indicating ROI information 349 for each of one or more ads 348 may be determined and stored. As another example, per document (set) conversion rate tracking/determination operations 350 may be used to generate information 353 indicating a conversion rate (e.g., across a collection of ads, or across all ads) 355 for each of one or more documents 354. If further information is available, information 357 indicating ROI information 359 for each of one or more documents 358 may be determined and stored.

Document quality scoring operations 360 may use ad conversion rate information 343 (or ROI information 347) and/or document conversion rate information 353 (or document ROI information 357) to generate document score information 370. As shown, the document score information 370 may include a number of entries, each including a document identifier 372 and a document score 374. In at least some embodiments consistent with the present invention, score combination operations 380 may be used to generate document set score information 390. As shown, the document set score information 390 may include a number of entries, each including a document set identifier 392 and a combined (e.g., aggregate, average, etc.) score 394 for the document set. Alternatively, although not shown, this information 390 may be determined directly from the information about the ads with conversion tracking 332. Although not shown, a mapping of document identifiers to document set identifiers may also be stored.

The document scores may be used to indicate an expected conversion rate (e.g., conversions per selection, conversions per impression, conversions per some monetary value, etc.)

for the document over a collection of ads (e.g., all ads). Similarly, the document set scores may be used to indicate an expected conversion rate for the document set over a collection of ads (e.g., all ads). As will be described below, such scores can be used to adjust prices to be paid by advertisers when their ads are served on various different documents with various different conversion rates, or when their ads are served on different ad serving systems with different conversion rates, thereby allowing ad campaign management to be simplified. For example, an advertiser can provide a single maximum offer per selection (or even per impression) since they know the price that they pay will be discounted when their ads are served on documents under which selections are less valuable (for example, documents with a lower conversion rate, or a lower ROI, or documents belonging to a set of documents with a lower conversion rate, or a lower ROI).

Figure 4:
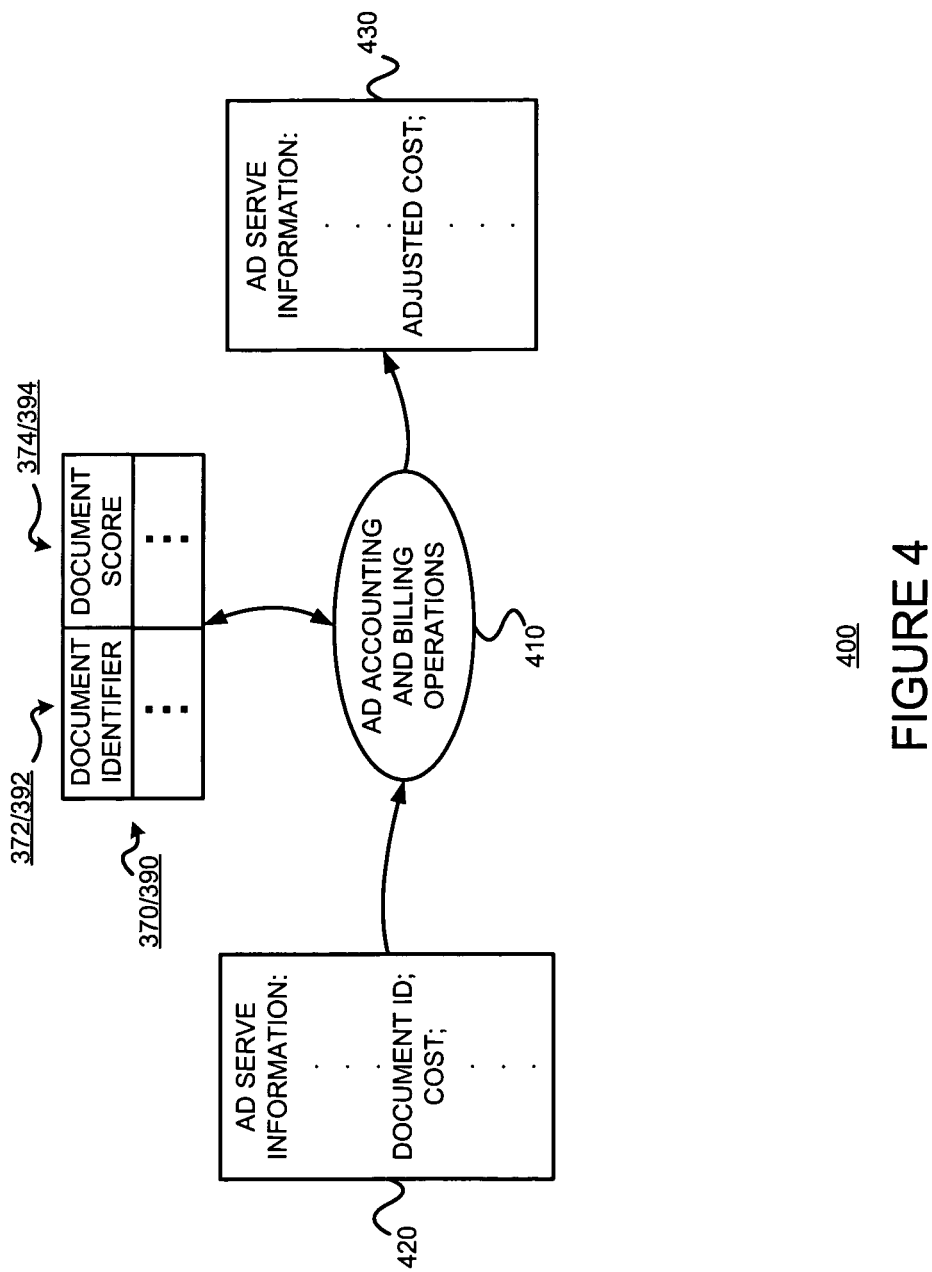
FIG. 4 is a bubble diagram of operations and information for adjusting ad costs using document scores in a manner consistent with the present invention.

FIG. 4 is a bubble diagram of operations and information for adjusting (e.g., discounting) ad costs using document scores in a manner consistent with the present invention. As shown, ad accounting and billing operations 410 may use document score information 370/390 to adjust (e.g., discount) a cost value in ad serve information 420, thereby generating new ad serve information 430 with an adjusted (e.g., discounted) cost value. More specifically, ad serve information 420 may include an identifier of an ad served, an identifier of a document (or document set) with which (e.g., on which) the ad was served, a cost value (e.g., a maximum offer, a discounted offer, etc.), and an advertiser. The ad accounting and billing operations 410 may use the document identifier in the ad serve information 420 to lookup a document (or document set) score in the document score information 370/390. The ad accounting and billing operations 410 may then use the document (or document set) score to adjust (e.g., discount) the value of the cost.

The cost adjustment may be used to reflect that fact that a value of some action, such as a selection (e.g., in terms of a conversion rate), may vary from one document to another, and the cost may be adjusted to reflect the differences in value of a selection. In some embodiments consistent with the present invention, the cost adjustment will always be a discount. In at least some other embodiments consistent with the present invention, the cost adjustment may involve a cost increase, so long as a cost doesn't exceed a maximum cost offer (or so long as an average cost doesn't exceed an average maximum cost offer).

§4.2.1 Exemplary Data Structures

Data structures, such as 343, 347, 353, 357, 370 and 390 of FIG. 3 and 420 and 430 of FIG. 4 for example, may be used to store information generated and/or used in a manner consistent with the present invention.

§4.2.2 Exemplary Methods

As introduced above, embodiments consistent with the present invention may be used to score documents, or sets of documents, using some measure of value of an action or user action triggering a cost to an advertiser. Exemplary methods that may be used to score documents, in a manner consistent with the present invention, are described in §4.2.2.1 below.

As also introduced above, embodiments consistent with the present invention may be used to adjust a cost for an action with respect to an ad (e.g., an ad selection) using a determined document score. Exemplary methods that may be used to adjust costs to be billed to advertisers, in a manner consistent with the present invention, are described in §4.2.2.2 below.

§4.2.2.1 Exemplary Methods for Determining Document Scores

Figure 5:
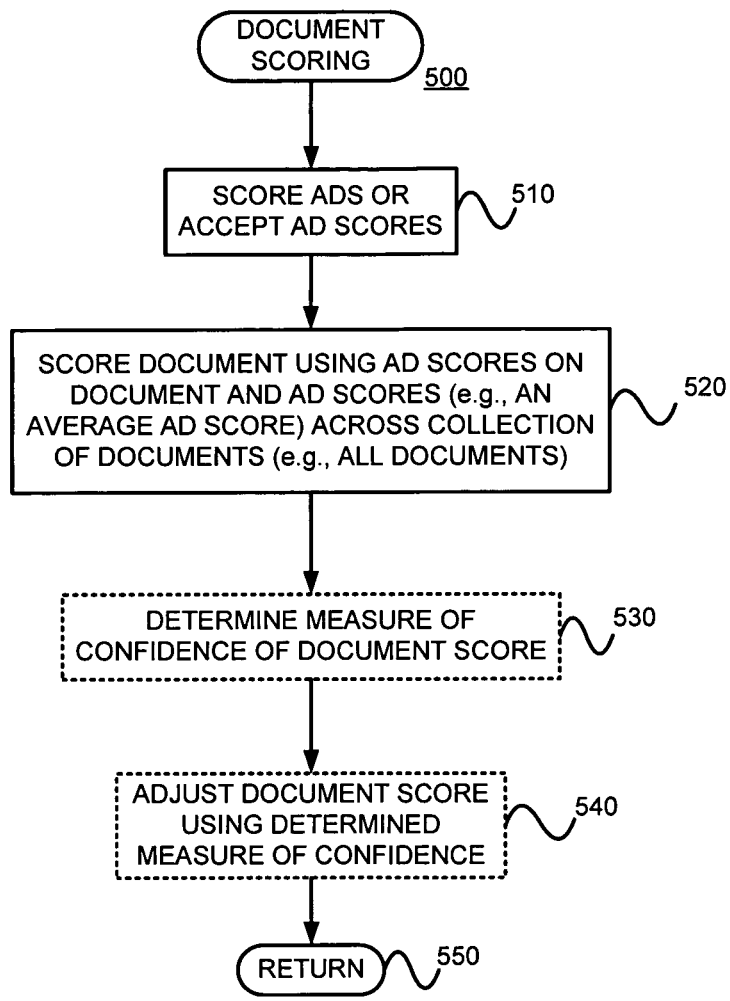
FIG. 5 is a flow diagram of an exemplary method for performing a document scoring operation in a manner consistent with the present invention.

FIG. 5 is a flow diagram of an exemplary method 500 for scoring a document in a manner consistent with the present invention. Ad scores are determined or accepted. (Block 510) The document is then scored using ad scores (e.g., ad ROI) on the document, and scores of the ads (e.g., average ad ROI) across a collection of documents (e.g., all documents). (Block 520) The method 500 may then be left. (Node 550)

Recall from block 510 of FIG. 5 that ad scores are accepted or determined. In at least one embodiment consistent with the present invention, the ad scores are ad ROI scores. The ROI may be determined for each advertiser-document pair. Let $R(A,D)$ be the sales per dollar invested for advertiser A on document D. Let $R(A,*)$ be the sales per dollar invested for advertiser A over all documents. As shown in simplified example of Table I, the last row shows a score for each ad over all documents. This score may simply be a simple or weighted average. Naturally, much more data would typically be available and used. The data sample may be from the N (e.g., N=1-12) most recent weeks. In at least some embodiments consistent with the present invention, more recent data may be weighted more heavily than less recent data. In at least some embodiments consistent with the present invention, the data may be "seasonalized" to consider a time of week, month, quarter, year, etc.

TABLE I

|       | A1         | A2         | A3         |
|-------|------------|------------|------------|
| D1    | $R(A1, D1)$ | $R(A2, D1)$ | $R(A3, D1)$ |
| D2    | $R(A1, D2)$ | $R(A2, D2)$ | $R(A3, D2)$ |
| D3    | $R(A1, D3)$ | $R(A2, D3)$ | $R(A3, D3)$ |
| All D | $R(A1, *)$  | $R(A2, *)$  | $R(A3, *)$  |

There are various ways of considering ROI (e.g., conversions per selection, conversions per dollar spent, transactions per selection, transactions per dollar spent, etc.).

Figure 6:
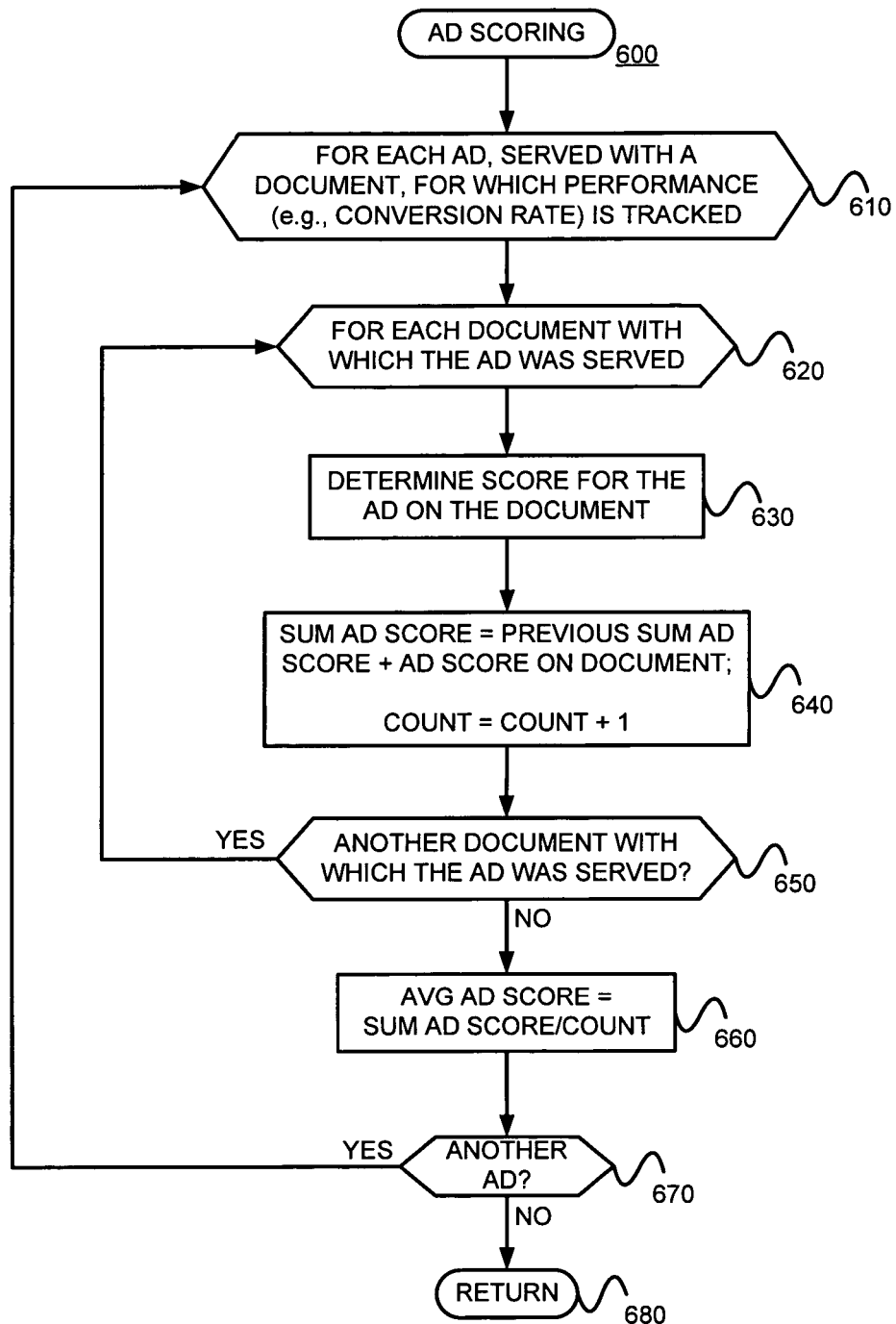
FIG. 6 is a flow diagram of an exemplary method for determining an ad score, which may be used in the scoring of a document, in a manner consistent with the present invention.

FIG. 6 is a flow diagram of an exemplary method 600 for performing ad scoring operations in a manner consistent with the present invention. As indicated by loop 610-670, a number of acts are performed for each ad served with a document for which performance (e.g., a conversion rate) is tracked. Further, as indicated by nested loop 620-650, a number of acts are performed for each document with which the ad was served. The score for the ad (or advertiser) on the document is determined. (Block 630) A score sum for the ad (or advertiser) is maintained, as is a count of the number of documents. (Block 640). After all of the documents have been considered, a score for the ad over all documents is determined. (Block 660) For example, the score may be an average score defined by the score sum divided by the count. Further ads may then be processed before the method 600 is left. (Node 680)

The score of an ad on a document may be determined in various ways. For example, ad ROI may be tracked and used. Alternatively, or in addition, ad conversion rate may be tracked and used. Also, although an average value is tracked, a value for an ad over all documents may be determined differently.

Once the ROI across documents and advertisers has been determined, it may be desired to eliminate an advertiser-specific meaning of conversion. More specifically, it may be desired to change the offers (i.e., the investment) on each document to make the ROI more even across documents, so that $R(Ai, Dj)$ is closer to $R(Ai, *)$. However, comparing ROI across advertisers is difficult because a "conversion" means different things to different advertisers. The ratio $S(Ai, Dj)=R(Ai, Dj)/R(Ai, *)$ for-each $ad_i$, and $document_j$ may be used to eliminate the advertiser-specific meaning of "conversion". Table II shows document scores. (Recall, e.g., 520 of FIG. 5.)

TABLE II

|    | A1       | A2       | A3       | All A |
|----|----------|----------|----------|-------|
| D1 | S(A1, D1)| S(A2, D1)| S(A3, D1)| S(D1) |
| D2 | S(A1, D2)| S(A2, D2)| S(A3, D2)| S(D2) |
| D3 | S(A1, D3)| S(A2, D3)| S(A3, D3)| S(D3) |

The score of a document, S(D), may be determined by determining how that document performed for each advertiser that was rendered with that document. Although the scores S(D) may be a simple average of the ratios, the score may be determined using an estimator function such as, for example, a weighted average (e.g., a Mantel-Haenszel estimator), an iterative estimator (e.g., a maximum likelihood estimator), etc.

In some embodiments consistent with the present invention, the document score may be adjusted using a measure of confidence in the document score (e.g., conversion rate) across a collection of ads. For example, a document with a score of 0.7, but wide variation across advertisers, may be treated differently than a document with the same score but very little variation.

One way to adjust for uncertainty about document score is to use the sampling distribution of the estimator. Using standard statistical techniques, a "confidence interval" can be estimated which will, ideally, contain the true score with some pre-specified probability, k. In one conservative embodiment consistent with the present invention, the estimated score and the standard deviation of the estimate can be used to construct an interval that will contain the true score with some pre-specified probability k. If this confidence interval is very large (i.e., large enough so that its upper bound is greater than 1), the cost might not be discounted at all, since in this case the score is not determined with sufficient accuracy. If, on the other hand, the confidence interval is tight, it may be assumed that the estimated score was determined with high precision and therefore, the score can be used to make an adjustment.

Alternatively, a Bayesian approach may be used and a loss function that measures the cost to over- or underestimating the score parameter may be specified. In this approach, an estimate for the score that minimized expected loss could be chosen. Typically, such an estimate would depend on the precision with which the score was estimated. In general, whatever approach is taken, the adjusted score may be a function of the score and a measure of confidence in the score.

As can be appreciated from the foregoing example, an embodiment in which a variation of document scores across ads is used to adjust a determined score may be useful. That is, when an ad is served with a document and selected, there will be no (or little) cost adjustment using a document score of the document unless advertisers are consistent in their score (e.g., ROI) on that document.

It may be undesirable to use S(D) scores for certain strategic partner publishers, especially those with guarantees. For example, with such publishers, which are often large publishers, contractual guarantees may require certain levels of payment to the publisher even if the advertisers are charged less.

If there is not enough conversion data to compute a score for all documents, indicators that have been found to have predictive value for the score may be used. These would typically be observed variables that are correlated with the scores which can be estimated. Standard statistical techniques can be used to estimate such relationships between a variable and other variables that are correlated with it. Alternatively, an estimate that is based on similarity with existing documents for which scores have been computed can be used. One such implementation is described in §4.2.4 below.

If there is not enough data to set S(D) with a desired degree of confidence, the computed S(D) can be mixed with some default value. For example, the score S(D) may be set to (a) the default value if there is no confidence in the calculated S(D), (b) the calculated value S(D) if there is complete confidence in the calculation, and (c) some combination of the default and calculated values for intermediate levels of confidence. The default value might be set low for brand new documents from new publishers (to have them prove themselves).

§4.2.2.2 Exemplary Methods for Adjusting Advertiser Costs

Figure 7:
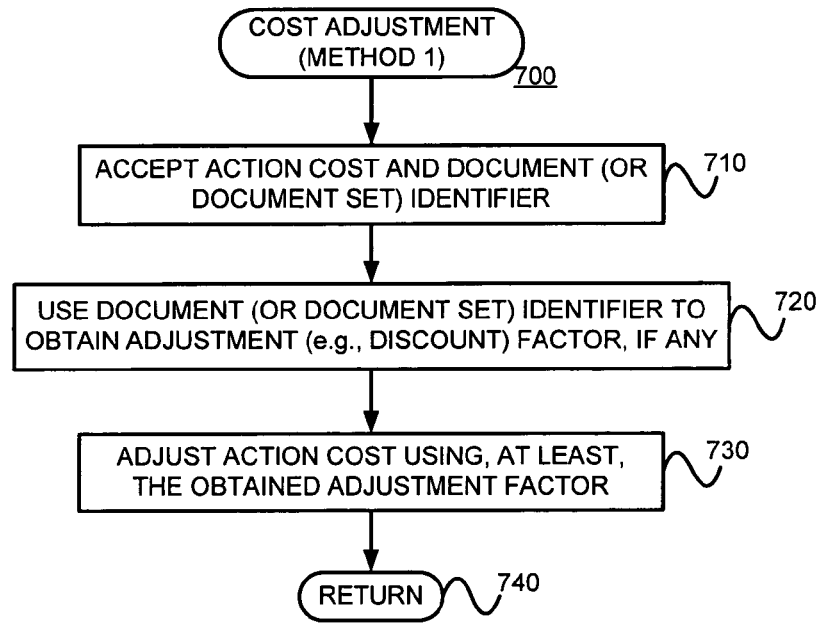
FIGS. 7 and 8 are flow diagrams of exemplary methods for adjusting or determining an ad cost using a document score, or document set score, in a manner consistent with the present invention.

FIG. 7 is a flow diagram of an exemplary method for adjusting an action cost (e.g., ad selection) using a document score, or document set score (referred to below as an "adjustment factor"), in a manner consistent with the present invention. An action cost and a document (or document set) identifier are accepted. (Block 710) The document (or document set) identifier is then used to obtain (e.g., lookup) an adjustment (e.g., discount) factor, if any. (Block 720) The accepted action cost is then adjusted using, at least, the obtained adjustment factor (Block 730) before the method 700 is left (Node 740).

Figure 8:
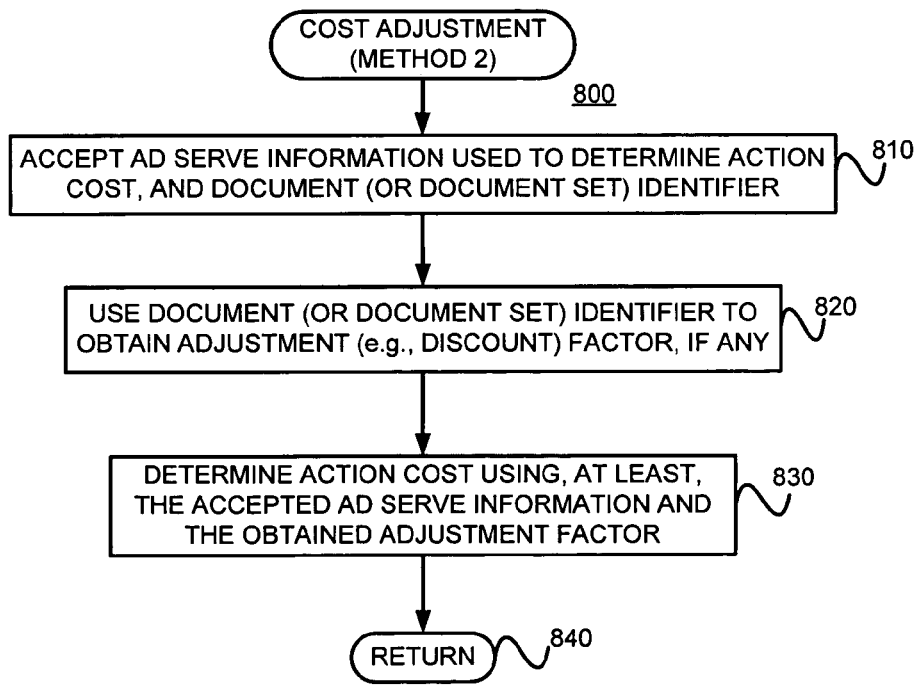

FIG. 8 is a flow diagram of another exemplary method for adjusting an action cost using a document score, or document set score, in a manner consistent with the present invention. Ad serve information used to determine the action cost are accepted. (Block 810) Such information may include, for example, one or more of offer information, a document (or document set) identifier, other ad offers (e.g., for discounting), performance information, etc. The document (or document set) identifier is then used to obtain (e.g., lookup) an adjustment (e.g., discount) factor, if any. (Block 820) Finally, the action cost is determined using the accepted ad serve information and the adjustment factor (Block 830) before the method 800 is left (Node 840).

In embodiments in which the adjusted cost is obtained by multiplying an initial cost by the document score, it may be undesirable to allow the document score to be greater than 1.0 if doing so would raise the final cost to be billed above the advertiser's stated maximum offer.

In at least some embodiments consistent with the present invention, the application of cost adjustment can be further controlled. For example, in one exemplary embodiment, an ad system-wide adjustment factor may be used. For example, ads served in a content-relevant ad serving system may have their costs reduced using a common factor while those same ads served in a search keyword-relevant ad serving system might not have their costs adjusted. Sets of documents may be defined such that one set of documents includes only documents with which content-relevant ads are served while another set of documents includes only documents with which query keyword-relevant ads are served. In yet other embodiments consistent with the present invention, the cost adjustment may be applied selectively, for example only if the ad was served with a document with a score in the bottom M % (e.g., M=1-10).

§4.2.3 Exemplary Apparatus

Figure 9:
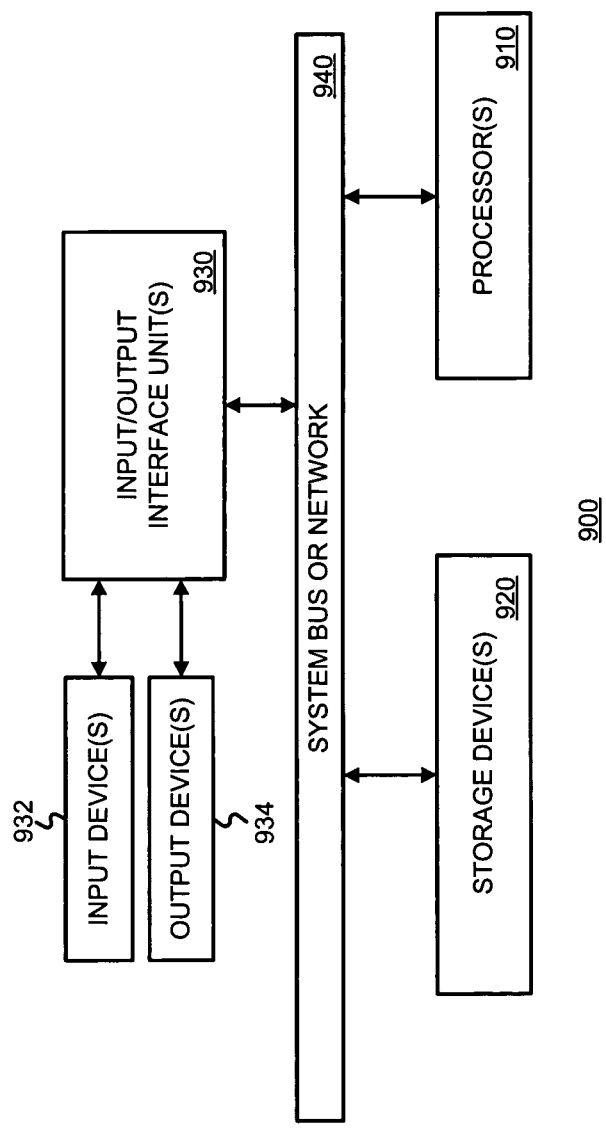
FIG. 9 is a block diagram of an exemplary apparatus that may perform various operations and store various information in a manner consistent with the present invention.

FIG. 9 is high-level block diagram of a machine 900 that may perform one or more of the operations discussed above. The machine 900 basically includes one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930.

The one or more processors 910 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 920 and/or may be received from an external source via one or more input interface units 930.

In one embodiment, the machine 900 may be one or more conventional personal computers. In this case, the processing units 910 may be one or more microprocessors. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 932, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 910 through an appropriate interface 930 coupled to the system bus 940. The output devices 934 may include a monitor or other type of display device, which may also be connected to the system bus 940 via an appropriate interface. In addition to (or instead of) the monitor, the personal computer may include other (peripheral) output devices (not shown), such as speakers and printers for example.

The various operations described above may be performed by one or more machines 900, and the various information described above may be stored on one or more machines 900. The ad server 210, search engine 220, content server 230, e-mail server 240, and/or user device 250 may include one or more machines 800.

§4.2.4 Alternatives and Extensions

Although some of the foregoing embodiments discussed scoring a document, and adjusting a cost using the document score, sets of documents can be scored and the cost adjustment may use the document set score. The set of documents may be documents belonging to one Website or one publisher for example. Note that although some of the exemplary embodiments were described in the context of publishers of content-based Web pages, the present invention may be used with other types of publishers, such as search engine Websites generating search result page views for example.

In some of the foregoing embodiments, it was assumed that there would be enough data to determine a document score. However, it may be the case that there won't be enough data to compute a score (or a score with a desired degree of confidence) for all documents. In at least some embodiments consistent with the present invention, a document score can be determined using data from "related" and/or "similar" documents. For example, if a document D does not have enough scores with high confidence, additional data is needed. A good source of such additional data would be to look at "related" and/or "similar" documents. As one example, a document similarity tree may be generated as follows. In a bottom-up process, a node for each document is created. Then at every step, two parentless nodes that are most similar to each other (using some similarity score, like similarity of the set of advertisers that they serve) are found and associated as sibling nodes under a new parent. Once the document similarity tree is generated, if a document D does not have enough data to compute a score S(D), D's parent D1 is found. Some data (e.g., sales, selections) of the parent D1 is set to be the sum of the data for all documents under D1. A score for the parent document S(A,D1) can be determined from the imputed data (i.e., data of its descendants). In a first alternative (e.g., if there is enough data) the new score of the document S(D) can be set to some mix of the score of the parent document S(D1) and the original score of the document S(D). In a second alternative (e.g., if there is not enough data), parent document D1's parent (D2) can be found, and the merging process can be continued. In yet another alternative, the score of the document S(D) can simply inherit the score of its parent S(D1).

At least some of the foregoing embodiments tracked some value of documents (e.g., a conversion rate), scored the documents using the tracked value, and adjusted (e.g., discounted) costs using the scores. In at least some embodiments consistent with the present invention, the value serving an ad with documents can be tracked with finer granularity. For example, the value of the document per ad can be tracked, the value of the document per ad collection (e.g., text ads, image ads, video ads, audio ads, ads from a given advertiser, etc.) can be tracked, the value of the document per targeting criteria (e.g., per keyword, per keyword collection, per geolocation, per time, per date, per season, per month, per day of week, per user type, per user behavior, etc.) can be tracked, the value of the document per targeting technique (e.g., keyword targeted with exact matching, keyword targeted with broad matching, content targeted, etc.), the value of the document per query match type can be tracked (e.g., exact, phrase, broad, etc.), etc. This tracked information may be used in determining more specific per document scores. Such more specific document scores can be selectively used to adjust costs. As one example, consider that in the embodiments described above where a cost using is adjusted using a general document score, if more than one ad were served on the document, their costs would be similarly adjusted (e.g., using the same document score). For example, all maximum offers per selection could be multiplied by the same factor S(D), in which case the set of results and the ordering wouldn't change. Consider an alternative embodiment consistent with the present invention in which ad-specific document scores S(D,A) could be used directly (e.g., if there was enough data). In such an alternative embodiment, the set of ads served and/or the ordering of ads might change from document to document.

Such an alternative embodiment might be challenging to implement, particularly if most advertisers do not participate in conversion tracking, or if most advertisers participating in conversion tracking will nonetheless have little document-specific conversion data. Using the non-ad specific document score S(D) benefits all advertisers and all publishers, while using S(D,A) is an additional benefit to very few advertisers. However, using S(D,A) scores may be beneficial in enticing advertisers to sign up for conversion tracking product.

In general, a cost to be paid by an advertiser for some action (e.g., an impression, a selection) may be adjusted using one or more factors that may affect (e.g., as shown by past data) the value of the action. Such factors may include various ad serving parameters such as when the ad was served, where the ad was served, the type of targeting used to serve the ad (e.g., concept, broad keyword, exact keyword, phrase, etc.), some measure of ad relevancy, some measure of publisher quality, etc.

For example, suppose a Webpage concerns teeth whitening. If an ad for teeth whitening were rendered on the Webpage, then its relevancy score might be high (e.g., 10). On the other hand, an ad for braces would likely have a lower relevancy (e.g., 4) if it were rendered on the Webpage. Thus, if the braces ad were rendered on the teeth whitening Webpage, the fact that it was less relevant could be used to discount the cost (e.g., 40% instead of 100%). Assuming conversion correlates to relevancy, this discount aligns the price of the selection with the value delivered.

As an example of discounting selections depending on the keyword performance of the type of targeting (broad vs. exact) or distribution (e.g. content vs. search), suppose the keyword "diamond" converts better when the ad is targeted to search than when it is targeted to content. This fact could be used to discount ads targeted to content using the concept "diamond." As another example, suppose that the keyword "diamond" converts ten times better via exact match (search query contains only that keyword) than broad match (search query contains any of the keywords or synonyms of the keyword). This fact could be used to discount the cost of ads using diamond with broad matching. The search example solves the current problem where advertisers measure the response for each keyword to discover the performance level, and then set their offer accordingly. In content, there may also be different types of targeting which could have different conversion rates (e.g., URL-based where the entire Webpage is crawled versus content extraction where javascript sends key pieces of the Webpage versus publisher specified keywords used as hints along with the page contents versus publisher specified keywords and no page content). The conversion rates of each of these different varieties of content targeting could be tracked and discounts could be applied commensurate with predicted value delivered.

As yet another example, selections may be discounted using a publisher quality metric (which may be a function of one or more of the use of pop-up ads, search index spamming techniques like invisible text, suspect fraudulent activity like clicking on ads or forging conversions, etc.). Depending on the publisher quality metric score, an additional discount could be applied to the publisher. The publisher quality metric score may be used to adjust the confidence level is poorly scoring publishers.

As can be appreciated from the foregoing example, the present invention may be used to further simplify ad campaign management.

Although in some of the embodiments described above, the cost was never increased using the document score, at least some alternative embodiments may increase the cost, or increase the cost provided that it does not exceed a maximum offer. In such embodiments, the scores over 1.0 may be modified lower using some confidence or deviation value (e.g., $SM=S-2\sigma$).

§4.3 Examples of Operations

In the following examples, suppose that the values (e.g., ROI) of selections of ads A1-A3 on documents D1-D3 have been tracked and are as indicated in TABLE III below.

TABLE III

|  | A1 | A2 | A3 |
|---|---|---|---|
| D1 | R(A1, D1) = 0.91 | R(A2, D1) = 0.92 | R(A3, D1) = 0.90 |
| D2 | R(A1, D2) = 0.60 | R(A2, D2) = 0.90 | R(A3, D2) = 0.80 |

TABLE III-continued

|  | A1 | A2 | A3 |
|---|---|---|---|
| D3 | R(A1, D3) = 0.41 | R(A2, D3) = 0.39 | R(A3, D3) = 0.38 |
| All D | R(A1, *) = 0.64 | R(A2, *) = 0.74 | R(A3, *) = 0.69 |

As shown, document D1 has uniformly high ROI, document D2 has widely varying ROI, and document D2 has uniformly low ROI. The ROI of each ad over all documents is defined as the average ROI of the ad in this example.

As shown in TABLE IV below, the score (S(Ai,Dj)) of each ad (Ai) on each document (Dj) is the ROI of the ad (Ai) on the document (Dj) divided by the average ROI of the ad (Ai). The score for the document is simply the average of the scores of the ads on the document.

TABLE IV

|  | A1 | A2 | A3 | All A |
|---|---|---|---|---|
| D1 | S(A1, D1) = 0.91/0.64 = 1.42 | S(A2, D1) = 0.92/0.74 = 1.24 | S(A3, D1) = 0.90/0.69 = 1.30 | S(D1) = 1.32 |
| D2 | S(A1, D2) = 0.60/0.64 = 0.94 | S(A2, D2) = 0.90/0.74 = 1.22 | S(A3, D2) = 0.80/0.69 = 1.60 | S(D2) = 1.25 |
| D3 | S(A1, D3) = 0.41/0.64 = 0.64 | S(A2, D3) = 0.39/0.74 = 0.53 | S(A3, D3) = 0.38/0.69 = 0.55 | S(D3) = 0.57 |

Assume that this exemplary embodiment increases the score by $2\sigma$ (twice the standard deviation) and limits it to 1.0. The modified scores would be SM(D1)=1.0, SM(D2)=1.0, and SM(D3)=0.69 (=0.57+2*0.058739). Notice that the cost of serving an ad on document D3 might be discounted by multiplying an initial cost by 0.69.

In different embodiments consistent with the present invention, the document scores may be determined differently. In different embodiments consistent with the present invention, the document scores may be modified differently, or not at all.

§4.4 Conclusions

As can be appreciated from the foregoing, the present invention is advantageous for ad serving systems that allow advertisers to use both keyword targeted and content targeted advertising. For example, Google presently offers both query keyword-relevant advertising with its AdWords system, as well as content-relevant advertising with its AdSense system. To simplify ad campaign management, Google has simply allowed advertisers participating in its AdWords system to "opt into" participating in its AdSense system. Currently, in both the AdWords and AdSense systems, an advertiser only pays when a user selects (e.g., clicks on) its ads. Since the present invention permits conversion rates to be normalized, advertisers can simplify the management of their ad campaign since they don't need to worry about having different offers for different systems with different conversion rates, or different publishers or Web pages with different conversion rates. Simplifying ad campaign management is advantageous to the advertisers. In addition, since advertisers don't need to worry about paying too much for having their ad served with a low value document, their maximum offers per selection should increase over time. This is advantageous to the entity serving the ads.

Moreover, in the context of a content-relevant ad system, the present invention helps to avoid subsidizing poor publishers (or Web pages) by good publishers (or Web pages). Furthermore, some publishers have fraudulently increased selections of ads on their Web pages. This is commonly referred to as "click spam". However, assuming that click spam publishers generate a lot of clicks but few sales, their scores will plummet. Consequently, advertisers won't have to pay much for those ads served with the documents of such publishers and those publishers won't receive much money. Alternatively, or in addition, if the scores are so low (or if the scores are low and other evidence of click spam exists) that it can be assumed that the publisher has engaged in click spam with a sufficient degree of certainty, such a publisher may be removed from an ad serving program altogether. This is advantageous over current approaches to click spam such as trying to detect it and then terminating those publishers from the ad serving program.

In the past, precise ad targeting techniques led to better quality but potentially lower revenue, while more relaxed ad targeting techniques led to poorer quality but potentially higher revenue. The present invention permits such quality versus revenue tradeoffs to be avoided.

What is claimed is:

1. A computer-implemented method comprising:
    a) accepting, with a computer system including at least one computer, ad scores, wherein each of the ad scores indicates a value of a user selection of an ad;
    b) scoring, with the computer system, a document using ad scores of the ads when the ads are served with the document and ad scores of the ads when the ads are served across a collection of documents to generate a document score;
    c) accepting, with the computer system, a cost for an action with respect to an ad when the ad is served with the document;
    d) adjusting, with the computer system, the cost using the document score to generate a modified cost; and
    e) billing, with the computer system, an advertiser associated with the ad, using the modified cost.

2. The computer-implemented method of claim 1 wherein each of the ad scores indicates a conversion rate of an ad.

3. The computer-implemented method of claim 1 wherein each of the ad scores indicates a return on investment for an ad selection.

4. The computer-implemented method of claim 1 further comprising:
    determining, with the computer system, a measure of confidence of ad scores for the document; and
    adjusting, with the computer system, the document score using the determined measure of confidence to generate a new document score.

5. The computer-implemented method of claim 4 wherein the determined measure of confidence of ad scores is a function of a standard deviation of the ad scores for the document.

6. The computer-implemented method of claim 1 further comprising:
    determining, with the computer system, the accepted ad scores, wherein the act of determining the accepted ad scores includes, for each ad served with a document for which a value of an action with respect to the ad is tracked,
        i) for each document
            A) determining a score for the ad of the document, and
            B) combining the determined score for the ad on the document with previously determined scores for the ad on other documents to generate a combined score for the ad, and
        ii) determining a new ad score across a collection of documents using the combined score for the ad.

7. The computer-implemented method of claim 6 wherein the new ad score across the collection of documents is an average score.

8. The computer-implemented method of claim 1 wherein the act of adjusting the cost reduces the cost.

9. The computer-implemented method of claim 1 wherein the document score is less than one, and wherein the act of adjusting the cost includes multiplying the cost by the document score.

10. The computer-implemented method of claim 1 wherein the act of accepting a cost accepts a cost per ad selection and includes
    accepting ad serve information used to determine the cost for an action with respect to the ad when that ad is served with the document, and
    determining the cost using the accepted ad serve information and the document score.

11. The computer-implemented method of claim 1 wherein the document is a Web page.

12. A computer-implemented method comprising:
    a) accepting, with a computer system including at least one computer, ad scores, wherein each of the ad scores indicates a value of a user selection of an ad;
    b) scoring, with the computer system, a document set including at least two documents using ad scores of the ads when the ads are served with the document set and ad scores of the ads when the ads are served across a collection of document sets to generate a document set score;
    c) accepting, with the computer system, a cost for an action with respect to an ad when the ad is served with a document of the document set;
    d) adjusting, with the computer system, the cost using the document set score to generate a modified cost; and
    e) billing, with the computer system, an advertiser associated with the ad, using the modified cost.

13. The computer-implemented method of claim 12 wherein each of the ad scores indicates a conversion rate of an ad.

14. The computer-implemented method of claim 12 wherein each of the ad scores indicates a return on investment for an ad selection.

15. The computer-implemented method of claim 12 further comprising:
    determining, with the computer system, a measure of confidence of ad scores for the document set; and
    adjusting, with the computer system, the document set score using the determined measure of confidence to generate a new document set score.

16. The computer-implemented method of claim 15 wherein the determined measure of confidence of ad scores is a function of a standard deviation of the ad scores for the document set.

17. The computer-implemented method of claim 12 further comprising:
    determining, with the computer system, the accepted ad scores, wherein the act of determining the accepted ad scores includes, for each ad served with a document of the document set for which a value of an action with respect to the ad is tracked,
        i) for each document set
            A) determining a score for the ad on the document of the document set, and
            B) combining the determined score for the ad on the document with previously determined scores for the ad on other documents of other document sets to generate a combined score for the ad, and
        ii) determining a new ad score across a collection of document sets using the combined score for the ad.

18. The computer-implemented method of claim 17 wherein the new ad score across the collection of document sets is an average score.

19. The computer-implemented method of claim 12 wherein the act of adjusting the cost reduces the cost.

20. The computer-implemented method of claim 12 wherein the document set score is less than one, and wherein the act of adjusting the cost includes multiplying the cost by the document set score.

21. The computer-implemented method of claim 12 wherein the act of accepting a cost accepts a cost per ad selection and includes
   accepting ad serve information used to determine the cost for an action with respect to the ad when that ad is served with the document of the document set, and
   determining the cost using the accepted ad serve information and the document set score.

22. The computer-implemented method of claim 12 wherein the document set is a Website.

23. The computer-implemented method of claim 12 wherein the document set consists of Web pages of a particular Web publisher.

24. The computer-implemented method of claim 12 wherein the document set consists of Web pages of a particular content server.

25. Apparatus comprising:
   a) at least one processor;
   b) an input for accepting ad scores wherein each of the ad scores indicates a value of a user selection of an ad; and
   c) at least one storage device storing a computer executable code which, when executed by the at least one processor, performs a method of
      1) scoring a document using ad scores of the ads when the ads are served with the document and ad scores of the ads when the ads are served across a collection of documents to generate a document score,
      2) accepting a cost for an action with respect to an ad when the ad is served with the document, and
      3) adjusting the cost using the document score to generate a modified cost.

26. The apparatus of claim 25 wherein each of the ad scores indicates a conversion rate of an ad.

27. The apparatus of claim 25 wherein each of the ad scores indicates a return on investment for an ad selection.

28. The apparatus of claim 25, the method further comprising:
   determining a measure of confidence of ad scores for the document; and
   adjusting the document score using the determined measure of confidence to generate a new document score.

29. The apparatus of claim 25, the method further comprising:
   determining the accepted ad scores, wherein the act of determining the accepted ad scores includes, for each ad served with a document for which a value of an action with respect to the ad is tracked,
   i) for each document
      A) determining a score for the ad on the document,
      B) combining the determined scare for the ad on the document with previously determined scores for the ad on other documents to generate a combined score for the ad, and
   ii) determining a new ad score across a collection of documents using the combined score for the ad.

30. The apparatus of claim 29 wherein the new ad score across the collection of documents is an average score.

31. The apparatus of claim 25 wherein the act of adjusting the cost reduces the cost.

32. The apparatus of claim 25 wherein the document score is less than one, and wherein the act of adjusting the cost includes multiplying the cost by the document score.

33. The apparatus of clam 25 wherein the act of accepting a cost accepts a cost per ad selection and includes
   accepting ad serve information used to determine the cost for an action with respect to the ad when that ad is served with the document, and
   determining the cost using the accepted ad serve information and the document score.

34. The apparatus of claim 25 wherein the document is a Web page.

35. Apparatus comprising:
   a) at least one processor;
   b) an input for accepting ad scores wherein each of the ad scores indicates a value of a user selection of an ad; and
   c) at least one storage device storing a computer executable code which, when executed by the at least one processor, performs a method of
      1) scoring a document set including at least two documents using ad scores of the ads when the ads are served with the document set and ad scores of the ads when the ads are served across a collection of document sets to generate a document set score,
      2) accepting a cost for an action with respect to an ad when the ad is served with a document of the document set,
      3) adjusting the cost using the document set score to generate a modified cost.

36. The apparatus of clam 35 wherein each of the ad scores indicates a conversion rate of an ad.

37. The apparatus of claim 35 wherein each of the ad scores indicates a return on investment for an ad selection.

38. The apparatus of claim 35, the method further comprising:
   determining a measure of confidence of ad scores for the document set; and
   adjusting the document set score using the determined measure of confidence to generate a new document set score.

39. The apparatus of claim 35, the method further comprising:
   determining the accepted ad scores, wherein the act of determining the accepted ad scores includes, for each ad served with a document of the document set for which a value of an action with respect to the ad is tracked,
   i) for each document set
      A) determining a score for the ad on the document of the document set, and
      B) combining the determined score for the ad on the document with previously determined scores for the ad on other documents of other document sets to generate a combined score for the ad, and
   ii) determining a new ad score across a collection of document sets using the combined score for the ad.

40. The apparatus of claim 39 wherein the new ad score across the collection of document sets is an average score.

41. The apparatus of claim 35 wherein the act of adjusting the cost reduces the cost.

42. The apparatus of claim 35 wherein the document set score is less than one, and wherein the act of adjusting the cost includes multiplying the cost by the document set score.

43. The apparatus of claim 35 wherein the act of accepting a cost accepts a cost per ad selection and includes
accepting ad serve information used to determine the cost for an action with respect to the ad when that ad is served with the document of the document set, and
determining the cost using the accepted ad serve information and the document set score.

44. The apparatus of claim 35 wherein the document set is a Website.

45. The apparatus of claim 35 wherein the document set consists of Web pages of a particular Web publisher.

46. The apparatus of claim 35 wherein the document set consists of Web pages of a particular content server.

47. Apparatus comprising:
a) at least one processor;
b) at least one input; and
c) at least one computer-readable storage device storing computer-executable instructions which, when executed by the at least one processor, perform a method including
  i) accepting ad conversion rates,
  ii) scoring a document using ad conversion rates of the ads when the ads are served with the document and ad conversion rates of the ads when the ads are served across a collection of documents to generate a document score,
  iii) accepting a cost per ad selection for an ad that is served with the document,
  iv) adjusting the cost using the document score to generate a modified cost, and
  v) billing an advertiser associated with the ad using the modified cost.

48. Apparatus comprising:
a) at least one processor;
b) at least one input; and
c) at least one computer-readable storage device storing computer-executable instructions which, when executed by the at least one processor, perform a method including
  i) accepting ad conversion rates,
  ii) scoring a document set including at least two documents using ad conversion rates when the ads are served with the document set and ad conversion rates of the ads when the ads are served across a collection of document sets to generate a document set score,
  iii) accepting a cost per ad selection for an ad that is served with a document of the document set,
  iv) adjusting the cost using the document set score to generate a modified cost, and
  v) billing an advertiser associated with the ad, using the modified cost.

49. The apparatus of claim 25 wherein the method further includes billing an advertiser associated with the ad, using the modified cost.

50. The apparatus of claim 35 wherein the method further includes billing an advertiser associated with the ad, using the modified cost.

* * * * *